United States Patent Office 3,518,430
Patented June 30, 1970

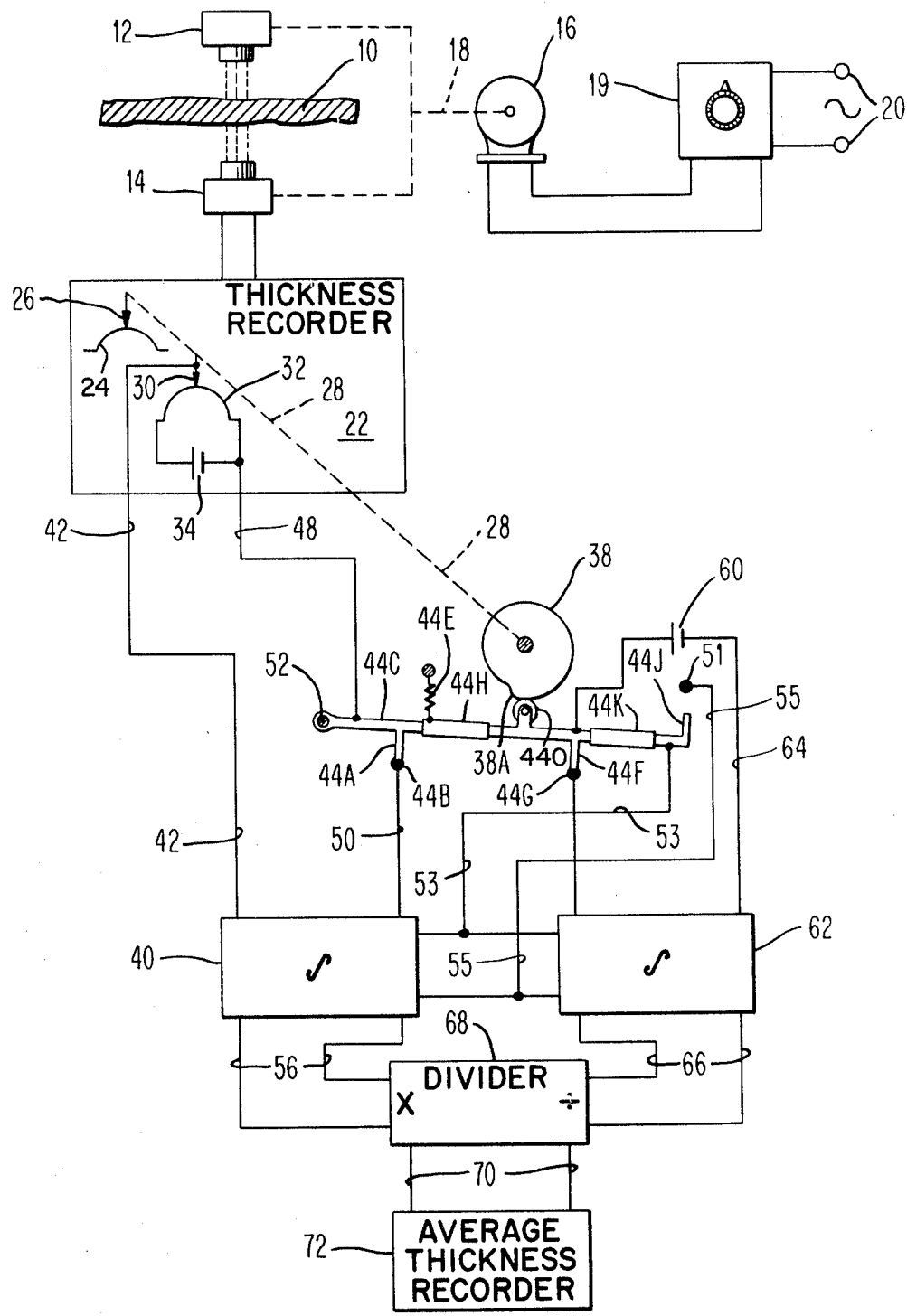

3,518,430
APPARATUS FOR MEASURING AVERAGE THICKNESS OR DENSITY OF STRIP MATERIAL
Elwood T. Davis, Havertown, Pa., assignor to Leeds & Northrup Company, Philadelphia, Pa., a corporation of Pennsylvania
Filed Oct. 24, 1967, Ser. No. 677,702
Int. Cl. G01n 23/14
U.S. Cl. 250—83.3      3 Claims

ABSTRACT OF THE DISCLOSURE

Average thickness or density across the width of a strip material is measured by integrating the output of a detector which scans the strip across its variable width and divides the value obtained by the integral of a fixed voltage, the integral being taken for the period of the scan. The result of the division is the average thickness or density of the strip scanned regardless of the width of the strip.

Background of the invention

This invention relates to means for measuring the average density or thickness of sheet or strip material and more particularly for continually monitoring the average density or thickness of moving sheet material having a width which is subject to variation.

Prior devices for making measurements of this type have utilized a detector which scans the width of the moving sheet material and which integrates the continuously measured density or thickness. The integrated value was then divided by a constant representative of the assumed width of the strip material which was scanned. Such measuring means were subject to error due to the normal variations in the width of the strip material and could likewise be subject to error due to changes in the scanning speed without a corresponding change in calibration.

Summary of the invention

In accordance with this invention there is provided a system for measuring the average thickness or density of sheet material which comprises a means for integrating the output of a thickness or density gauge as it scans the sheet material across its width and means for dividing the resulting integral by a variable representative of the time during which the gauge was measuring the thickness or density so that there is produced, as a result of this division, an output signal indicative of the average thickness or density of the sheet material.

Brief description of the drawing

The single drawing shows one embodiment of the invention schematically in block diagram form.

Description of the preferred embodiment

In the figure there is shown one form of apparatus which will operate to provide a measurement of the average thickness or density of moving sheet material such as paper, rubber, plastic, film, etc., where that measurement is made under conditions which may include a variation in the width of the strip or a variation in the time of the scanning operation. In the figure, the strip material 10 is shown as having a variable thickness across its width. This sheet material 10 is shown in cross section and may be considered as an exaggerated illustration of thickness variations found in continuously moving sheets of material being manufactured or processed. In the figure, a source of beta rays 12 is utilized as part of a beta ray detector or gauge. The other element of the detector or gauge is the receiving element 14. The beta ray source 12 continually emits beta rays which are received by detector 14. The transmission of beta rays to the receiving element 14 is modified by the sheet material 10 so that the magnitude or intensity of the beta rays emission from source 12 received by receiver 14 is an indication of the density of the intervening material.

If it is assumed that the sheet material 10 is normally homogeneous in character throughout, the measurement then becomes a thickness measurement. It will be understood, of course, by those familiar with this art that where materials of varying density are to be measured, the same type of gauge or detector may be used as an indication of the density of the material if one can assume that the thickness remains constant across the width being scanned. Thus, the present apparatus may be used both as a means for determining the average density of a nonhomogeneous material having constant thickness or, alternatively, as a thickness detector for a homogeneous material having variable thickness or simply a mass measurement. Thus, either the density or the thickness may be the measured characteristic with which the apparatus of the figure is concerned. For the purpose of simplicity of description, it will be assumed that thickness is the measurement being made.

As shown in the figure, both the source 12 and the receiver 14 are mechanically moved by the scanning motor 16 and its mechanical coupling 18, which connects the shaft of the motor to the source 12 and receiver 14 so as to cause them to simultaneously scan the strip 10 from one edge to the other edge.

The speed of the motor 16 and hence the rate at which the scanning operation is accomplished may be varied by a speed adjusting device 19 between the source of alternating current connected to terminals 20 and the motor 16 itself.

The receiver 14 of the beta gauge or detector is connected to the thickness recorder 22 which serves to continuously measure and record the output of the receiver 14 so as to provide an instantaneous measure and/or indication of the thickness of the sheet material 10 as it is scanned. The recorder 22 may be any of a number of standard recorders and may include, for example, a measuring slidewire 24 having a movable contact 26 which is positioned in accordance with the output of the receiver 14 by a continuously balancing system in the recorder. The movable contact 26 is connected by the mechanical linkage 28 to contact 30 of retransmitting slidewire 32 which has across its end terminals a constant source of potential represented by battery 34.

A cam 38 is also provided and is mechanically coupled by way of linkage 28 to rotate with the movement of slidewire contact 26. It is the function of the cam 38 to connect the electrical signal produced from the position of contact 30 on slidewire 32 to the integrator 40 by way of the connecting wire 42 and the closed contacts 44A and 44B which complete a circuit from one terminal of battery 34 through conductor 48 and conductor 50 to integrator 40. The contact 44B is mounted to be stationary while the contact 44A is mounted on a pivoting arm 44C which is pivoted about the point 52. As shown in the drawing, the contact 44A is connected to line 48 while contact 44B is connected to line 50.

The cam 38 is so shaped that the roller 44D, operating as a cam follower, is pushed in a downward direction as it follows the increased diameter of the cam 38 resulting from the rising shoulder 38A of the cam. The cam 38 is so arranged that this action occurs as the beta ray gauge intercepts the left-hand edge of the sheet material 10 in a left to right scan operation. Prior to the interception of the left-hand edge of the sheet material, the spring 44E causes the pivoting element 44C to maintain the contact 44A out of engagement with the contact 44B.

The engagement between the contacts 44A and 44B is thus coordinated with the initial detection by the recorder 22 of the interception of the beta rays by the strip material 10. Similarly, the contacts 44A and 44B will disengage after the beta rays have scanned the strip material 10 and the recorder 22 again detects a zero thickness.

It will be evident that the integrator 40 is operative to provide on its output conductors 56 an electrical signal which is representative of the integral of the thickness of the strip 10 as measured and detected by recorder 22.

The pivoting member 44C carries contact 44F which is engaged with fixed contact 44G at the same time that the contacts 44A and 44B are engaged. The movable contact 44F is isolated from the contact 44A by the insulating segment 44H.

A fixed potential is supplied by way of battery 60 so that one terminal is connected by way of contacts 44F and 44G to integrator 62 and the other terminal is connected by way of conductor 64 to integrator 62. Integrator 62 will thus provide an output on its conductors 66 in the form of an electrical signal representative of the time duration of the engagement between contacts 44F and 44G, and hence the time duration of the interception of the beta ray detector by the strip material 10 as it scans the strip material.

Both the conductors 56 and the conductors 66 are connected to the divider 68 which serve to divide the signal on conductors 56 by that signal on conductors 66. The resulting output on lines 70 from the divider 68 is an electrical signal representative of the average thickness of the sheet material 10.

The signal provided on output line 70 of divider 68 is introduced as an input to recorder 72 so as to provide a continual measurement of the average thickness of the strip material 10 as it is being scanned by the beta ray gauge, and to provide at the end of the scanning operation an average thickness for the entire width of the strip which average value will be independent of the strip width and also independent of the speed of the scanning operation as adjusted on the scan speed adjusting device 18.

Since the signal provided on line 66 is representative of the time period during which the scanning operation is made over the strip material 10, the integrator 62 and the source of constant potential 60 may be replaced by any other apparatus which is capable of providing an electrical signal representative of the time duration of the engagement of contacts 44F and 44G.

In the normal operation of systems of the type described, the thickness gauge will be mechanically coupled to the motor 16 so that the gauge repeatedly scans the strip as the strip moves. After each scan it is, of course, necessary to reset the integrators 40 and 62. For this purpose the pivoting member 44C includes a contact 44J which is insulated by segment 44K from the other contacts and which is oriented to engage the fixed contact 51 so as to provide a connection between lines 53 and 55. Lines 53 and 55 are connected to both integrators 40 and 62 so as to effect a resetting of those integrators upon engagement of contacts 44J and 44K which occurs when cam 38 rotates to a position indicative of the detection of a zero thickness by the gauge.

What is claimed is:

1. Apparatus for measuring on continuously moving sheet material the average of a characteristic measurable over the width of said sheet comprising measuring means including a detector operable to produce a first signal representative of the instantaneous value of said characteristic in the area adjacent the detector, means for moving said detector so as to scan across the width of the sheet material, a source producing a constant signal, calculating means including dividing means and integration means, said calculating means being responsive to said first signal and said constant signal to produce an output signal representative of the ratio of the integral of said first signal to the integral of said constant signal, and means for initiating the integration of said integration means in response to the detection of one edge of said sheet material by said detector and for terminating said integration and resetting said integrator upon detection of the other edge of said sheet material by said detector.

2. Apparatus as set forth in claim 1 in which said detector is a beta gauge.

3. Apparatus as set forth in claim 1 which includes means for resetting the integrating means, said resetting being effected after each complete scan by said detector across the width of said sheet material.

References Cited

UNITED STATES PATENTS 2,909,660    10/1959    Alexander.
3,190,261    6/1965    Ziffer.

RALPH G. NILSON, Primary Examiner

M. J. FROME, Assistant Examiner

U.S. Cl. X.R.

324—68